United States Patent
Dombroski et al.

(10) Patent No.: US 7,226,133 B2
(45) Date of Patent: *Jun. 5, 2007

(54) ENVIRONMENT PROTECTOR AIR COMPRESSOR PRESSURIZED WHEEL HUB

(75) Inventors: Henry Dombroski, Boynton Beach, FL (US); Anthony Cunningham, Tequesta, FL (US)

(73) Assignee: Air Tight, LLC, Tequesta, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/699,565

(22) Filed: Oct. 30, 2003

(65) Prior Publication Data

US 2004/0169416 A1 Sep. 2, 2004

Related U.S. Application Data

(63) Continuation-in-part of application No. 10/376,756, filed on Feb. 28, 2003.

(51) Int. Cl.
*B60B 27/00* (2006.01)
*F16C 33/76* (2006.01)

(52) U.S. Cl. .................... 301/108.1; 384/489

(58) Field of Classification Search .......... 301/105.1, 301/108.1–108.5; 384/189, 190.6, 190.7; 152/415–417
See application file for complete search history.

(56) References Cited

U.S. PATENT DOCUMENTS

| | | | | |
|---|---|---|---|---|
| 3,064,982 A * | 11/1962 | Stephens | ................... | 277/402 |
| 3,169,809 A * | 2/1965 | Pendleton | ................ | 301/108.3 |
| 3,226,162 A * | 12/1965 | Eberle | ..................... | 301/108.1 |
| 3,460,874 A * | 8/1969 | Johnson | ..................... | 384/489 |
| 3,649,080 A * | 3/1972 | Molinare | ................. | 301/108.1 |
| 3,785,706 A | 1/1974 | Vangalis | | |
| 4,027,743 A * | 6/1977 | Deller et al. | ................. | 184/6.4 |
| 4,190,133 A | 2/1980 | Ploeger | | |
| 4,262,978 A * | 4/1981 | Everett | ...................... | 384/132 |
| 4,489,988 A * | 12/1984 | Robbins | ................. | 301/108.4 |
| 4,557,526 A | 12/1985 | Smith | | |
| 4,730,656 A * | 3/1988 | Goodell et al. | ............. | 152/417 |
| 4,924,697 A * | 5/1990 | Hunt et al. | ................ | 73/146.8 |
| 5,054,859 A * | 10/1991 | Goettker | ................... | 301/108.1 |
| 5,098,168 A * | 3/1992 | Johnson | .................. | 301/124.1 |
| 5,192,117 A * | 3/1993 | Kuck | ...................... | 301/108.1 |
| 5,203,391 A * | 4/1993 | Fox | ............................ | 152/416 |
| 5,221,381 A * | 6/1993 | Hurrell, II | .................. | 152/416 |
| 5,236,028 A * | 8/1993 | Goodell et al. | ............. | 152/417 |
| 5,429,167 A * | 7/1995 | Jensen | ....................... | 152/417 |
| 5,535,516 A * | 7/1996 | Goodell et al. | ............. | 152/417 |
| 5,979,232 A * | 11/1999 | Halcomb | ................... | 73/146.8 |
| 5,983,728 A * | 11/1999 | Weng | .......................... | 73/744 |
| 6,260,595 B1* | 7/2001 | Cobb | ......................... | 152/417 |
| 6,325,123 B1* | 12/2001 | Gao et al. | .................... | 152/416 |
| 6,325,463 B1 | 12/2001 | Sitter et al. | | |

* cited by examiner

*Primary Examiner*—Jason R. Bellinger
(74) *Attorney, Agent, or Firm*—McHale & Slavin PA

(57) ABSTRACT

A pressurized wheel hub formed from an air-tight sealing arrangement located on each end of a wheel hub to form a closed air system in the interior of the wheel hub. The closed air system fluidly coupled to a DC power air compressor for receiving pressurized air. A pressure gauge provides a visual indication of the air pressure in the closed air system whereby a breached seal condition within the wheel hub can be detected.

10 Claims, 2 Drawing Sheets

ENVIRONMENT PROTECTOR AIR COMPRESSOR PRESSURIZED WHEEL HUB

RELATED APPLICATION

This application is a continuation-in-part of patent application Ser. No. 10/376,756, filed Feb. 28, 2003.

FIELD OF THE INVENTION

This invention is related to the field of wheel hubs and, in particular, to a apparatus that permits the pressurization of a wheel hub to indicate hub seal integrity.

BACKGROUND OF THE INVENTION

This is an improvement of our pressurized wheel hub disclosed in the above captioned patent application for use in pressurizing the wheel hub automatically. By way of background, a conventional boat trailer utilizes a fixed axle secured to a trailer frame. A wheel assembly is coupled to the axle by use of a wheel hub. The wheel hub employs a bearing assembly to allow free rotation of the hub in relation to the axle. Thus, the wheel assembly, which includes the tire, permits transportation of the boat trailer over a road when trailered by an automobile. The conventional wheel hub employs bearings, namely an inner and outer bearings with an associated inner and outer race, which permits rotational movement in relation to the axle.

As with any friction producing components, it is imperative that the bearings are lubricated in order to prevent premature wear. Typically, a bearing grease is used which liquefies during bearing rotation for use in lubricating the bearings. The grease is sealed within the hub by use of an oil seal positioned along an inner side surface of the hub, and a bearing cap positioned along an outer side surface of the hub. The seals are used to prevent liquified grease from escaping the hub joint.

Thus the integrity of the oil seal and hub cover is critical to prevent loss of grease. Absence of a lubricant can quickly lead to catastrophic failure of the bearings causing hub disengagement of the axle, which can result in wheel assembly loss and the associated dangerous scenario of property and possibly life endangerment. For instance, a trailer carrying a heavy load such as a 25 foot boat, will quickly heat up a bearing that is not properly lubricated. Should the bearing fail, the bearing and race will typically disintegrate with a likely result of the hub and wheel detaching from the axle of the trailer. Boat trailers present an excellent example of premature wear as a boat trailer is typically inserted into water for loading or unloading of the boat. Should there be a failure of the hub seal, water is allowed to enter the hub resulting in the premature wear. In addition, should the water be saltwater, bearing disintegration is greatly enhanced since rust forming on the bearing surfaces will operate to destroy the bearings with very short use.

In light of the above numerous attempts have been made in order to prevent loss of bearing lubricant Many prior art wheel hub devices maintain pressurized grease within the hub. A very successful system consists of a modified hub cap having a grease fitting with a spring which visually indicates that grease has been inserted into the hub. However, should the hub seal fail, the assembly will actually facilitate grease being pushed through the seal. Should the spring jam, even if the bearing indicator illustrate that grease is prevalent in the seal, it may be providing a false indication. In addition, a slow leak will allow grease to be inserted into the hub and upon liquification during operation the seal could allow the liquified grease to easily escape.

Unfortunately, a spring loaded system to pressurize grease into the hub results in an excess amount of grease injected into the hub for proper operation. This results in an obvious waste of grease for only the bearing rollers must be lubricated. Thus, the amount of grease necessary is simply a coating over the bearing rollers. The spring loaded system advocates that should a seal leak, the user need simply pump more grease into the wheel hub on a continuous basis. Of course, the grease continues to leak from the wheel hub because the breach in the seal remains. For instance, a person may check a hub and insert grease into the hub before taking the trailer on the road. Once the trailer reaches operating speed, the liquified grease may easily escape. Should the operator back trailer into a lake, for purposes of unloading a boat, grease that has escaped from the hub and remains on the trailer will be exposed to the water.

Prior art patents directed to wheel bearing lubricators teach that the release of grease into the water is advantageous. Vangalis, U.S. Pat. No. 3,785,706, discloses a hub cap of transparent plastic which is closed at the outer end and contains a spring-backed piston for applying pressure on lubricant grease in the hub cap for yielding when the lubricant expands. The hub cap has two small vents, one for permitting lubricant to escape when expansion is excessive and the other to vent the enclosed portion of the hub behind the piston to atmospheric pressure.

Ploeger, U.S. Pat. No. 4,190,133, discloses a wheel bearing pressure lubricator for hubs subject to periodic submersion in water. The device includes a piston for relieving excess lubricant pressure and a piston position indicator providing a visual indication when the piston is in hub filled position and when the piston is in a no pressure position at which the piston ceases to apply pressure to the lubricant in the hub.

The adverse environmental impact of petroleum product contamination of natural water environments is well known. The constant expulsion of grease into natural waters by the prior art bearing lubrication systems will have a cumulative negative impact on the environment. In the year 2001, the National Marine Manufacturers Association estimated that 7,564,900 boat trailers were in operation, a significant number of which are continuously expelling grease into natural waters. Should the water be a reservoir for drinking water, even a few drops of oil can result in system contamination. However, it is well known that any oil in water has an adverse effect to wildlife. The continued water pollution by leaking wheel hubs is unnecessary and preventable, and that there remains a need for an "environmentally friendly" system of bearing maintenance.

Thus, what is lacking in the art is a positive indication of hub and oil seal integrity to indicate availability of bearing grease within the hub which does not release grease into the environment.

SUMMARY OF THE INVENTION

In light of the above, the applicants propose a wheel hub assembly capable of providing an air-tight seal for receipt of pressurized air from a vehicle mounted air compressor. The air-compressor provides continual hub pressurization despite temperature fluctuations. A pressure gauge can be mounted anywhere along the pressurized system providing a visual indication of the internal pressure and seal integrity.

It is an objective of the instant invention to provide a means for indicating oil seal integrity for axle hub assemblies used on boats.

Another objective of the instant invention to provide a means for maintaining a predetermined amount of pressurized air in axle hub assemblies which is automatically adjusted despite large flucuations in temperature such as those found with a trailer is submersed in very warm or very cold water.

Still another objective of the instant invention is to provide a visual indicator that operates before grease liquidisation, during grease liquidisation, and after grease liquidisation of the grease providing a positive indication that wheel bearing grease has not escaped the hub.

Still another objective of the instant invention is to provide an indicator for law enforcement that hub integrity is intact before allowing trailer placement within a body of water thereby preventing a leaking hub from contamination of water with oil byproducts.

Still another objective of the instant invention is to provide an indicator for law enforcement that hub integrity is intact during trailer placement within a body of water thereby indicating a leaking hub that might otherwise be concealed by placement under the surface of the water.

Yet still another objective of the instant invention is to provide a positive pressure within the hub at all times to prevent the entrance of particles within the hub including water thereby preventing premature destruction of the wheel bearing assemblies.

In accordance with the above objectives, a pressurized wheel hub is provided which comprises a wheel hub having bearings that are rotatably securable to an axle; seals between the wheel hub and the axle, the seals forming a closed air space around the bearings; and a means for insertion of pressurized air into the closed air space. The pressurized wheel hub preferably includes a pressure gauge to determine the level of pressurized air placed within the wheel hub.

The wheel hub comprises a sealing arrangement that provides an air-tight sealing arrangement for the bearings of a wheel hub to form a closed air system in the interior of the wheel hub. An aperture is formed through the axle to provide an air flow connection with a remotely mounted air compressor used to pressurize the closed air space through the aperture. An air pressure gauge provides a visual indication of the level of air pressure in the closed air system whereby a breached seal condition within the wheel hub can be detected by the inability to maintain a pressurized system. The hub cap may also be used to provide a seal wherein the degradation of the hub bearing outer seal will not result in air loss or grease leakage.

DETAILED DESCRIPTION OF THE INVENTION

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

Figure 1:
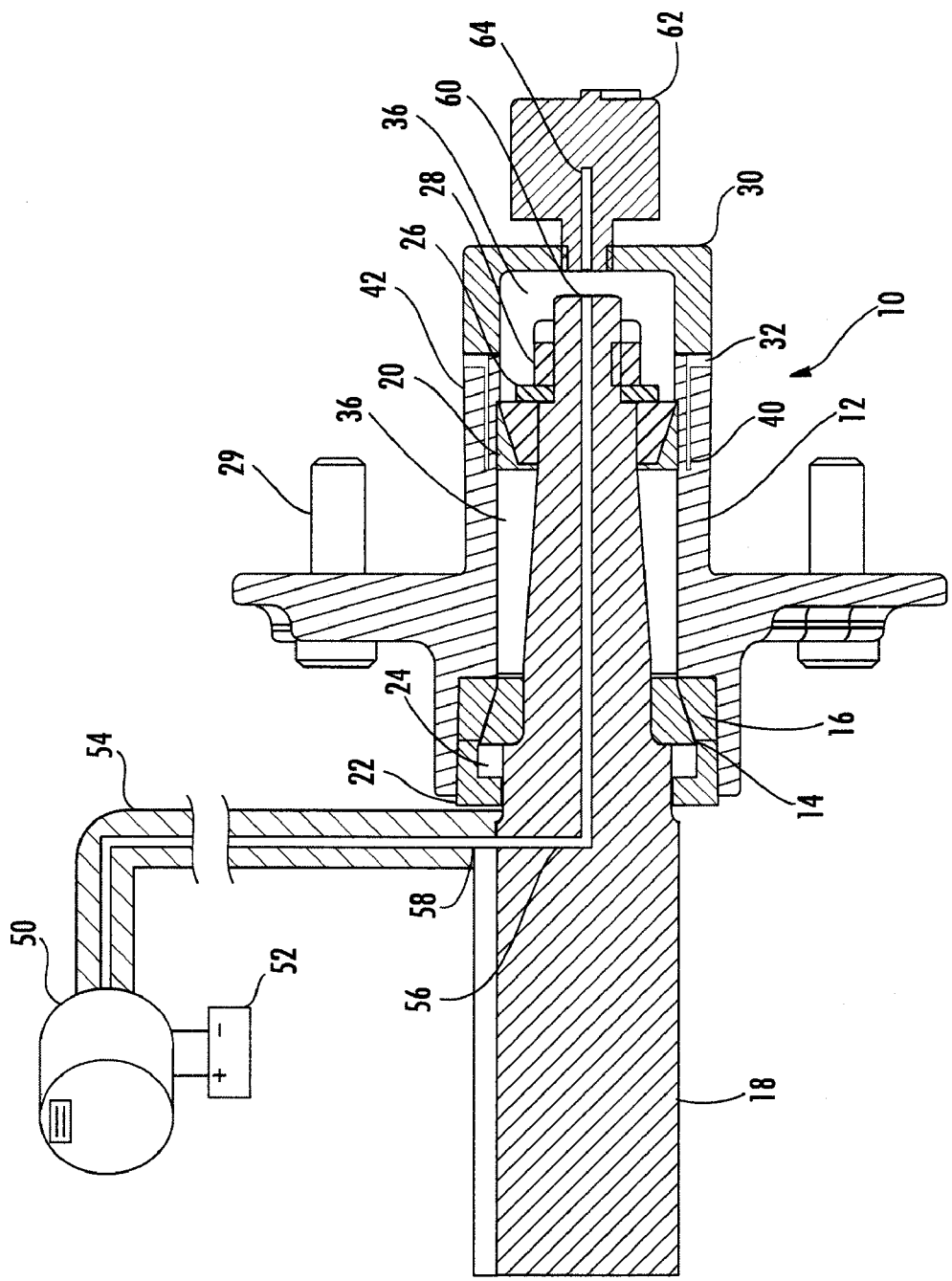
FIG. 1 is a cross-sectional view of the pressurized wheel hub shown mounted on an a trailer axle and coupled to an air compressor.

FIG. 1 is a cross-sectional side view of a wheel hub assembly 10 constructed from a hub 12 rotatably supported on inner bearing 14 operatively associated with inner bearing race 16, and outer bearing 18 operatively associated with outer bearing race 20. A modified oil seal 22 has a seal 24 capable of sealing air. The hub 12 is secured to the axle 18 by use of a washer 26 and nut 28 connection, wheel coupling bolts 29 are shown for reference. A cap 30, commonly referred to as a dust cap, includes a seal 32 capable of sealing air. The space between the cap 30 and the oil seal 22 forming a enclosure defined as the closed air space 36. The cap 30 has an annular shoulder 40 that frictionally engages a mating section 42 of the hub 12. The annular shoulder 40 includes a circumferential recess therein which receives a rubber O-ring 32 so that a fully air tight seal can be achieved, thus creating a closed air system within the wheel hub 12. The wheel hub 12 includes is pressurized by use of a small DC air compressor 50 that can be mounted on the trailer or the vehicle pulling the trailer. The air compressor 50 is preferably mounted on the trailer in close proximity to the hub assembly wherein electrical power may be obtained through the trailer harness for connection to a car battery 52. To eliminate the need for additional wiring, the air compressor can be operated from the driving light circuit wherein the compressor would have power as long as the driving lights are operating on the towing vehicle. Similarly, the air compressor can be operated from the back-up light circuit wherein compressor operation is used only when the trailer is back-up, which is required for launching of a boat from the trailer.

The air compressor 50 is coupled to the axle by a pressure-proof hose 54. The axle 18 has a pneumatic chamber 56 coaxially disposed therein with an inlet 58 located outside of oil seal 22 and an outlet 60 exhausting into the closed air chamber 36. The air compressor 50 is capable of maintaining a predetermined pressure in the closed air space, typically between 1 psi and 3 opsi. The actual pressure is determined by the type of seals to be employed since certain seals cannot handle the higher pressures. In the preferred embodiment, the air compressor will automatically compensate for differing loading characteristics which can change the pressure reading of the hub. For instance, if the hub is filled to 10 psi, operating the towing vehicle at highway speeds will have tendency to warm the air within the hub assembly and increase air pressure. Similarly, should the hub assembly be subjected to very cold temperatures, such as when the hub assembly is placed under water during the launching of a boat, the result will be a decrease in air pressure. This may cause a false reading to an unsuspecting law enforcement official when no loss of seal integrity has occurred, but the appearance of a reduction in air pressure would otherwise indicate such an event.

The cap 30 may include a pressure gauge 62 to provide a visual indicator of seal integrity. Obviously another visual indication of seal breach would occur when the wheel hub is submerged whereby the law official could easily determine wheel hub leakage due to air release and the resulting bubbling. An air gauge may also be remotely mounted by directly coupling into the air line 54. The use of a conventional air pressure gauge 62 in an air flow connection with the closed air system is operable to provide a visual indication of the air pressure within the wheel hub 12. The air pressure gauge 62 enables an observer to immediately detect a breached seal condition within the wheel hub by the resultant loss of air pressure within the wheel hub 12.

The air pressure gauge 62 can have a cup shaped housing having a conduit 64 extending therefrom providing a passage to the internal chamber of air pressure gauge. The air pressure gauge is of a conventional design, and includes a dial in the form of an annular disk having the standard numeric indicia thereon in the form of radial graduations. A pressure indicating needle moves relative to the annular disk in direct relation to the air pressure within the wheel hub. The disk can also include alphanumeric indicia specific to the function of the present invention corresponding to the position of pressure indicator needle. For example, the disk can indicate an optimum air pressure fill level, and can include color coded regions to alert observers that the seal has been breached. For instance, a gauge indicator could show green if the hub integrity is proper, or red is no pressure is available so as to indicate seal breach.

Figure 2:
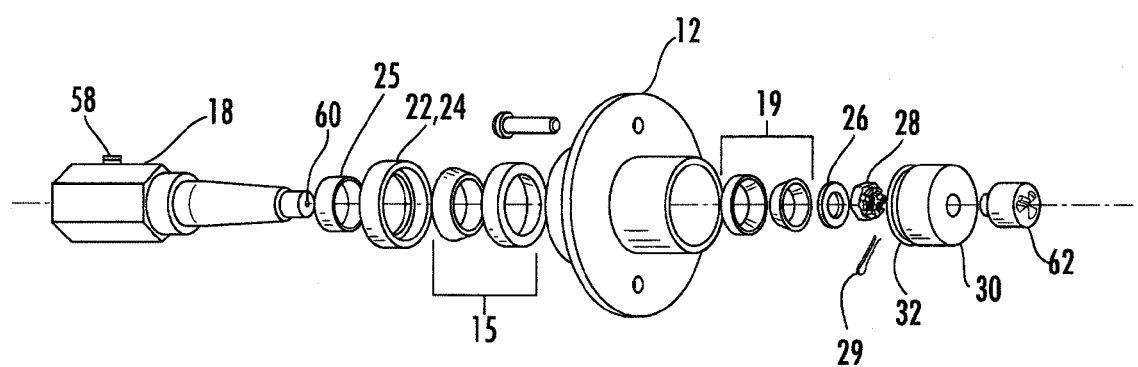
FIG. 2 is an exploded by of the pressurized wheel hub and axle assembly shown in FIG. 1.

FIG. 2 is an exploded illustration of the wheel hub 12 and wheel and axle 18. The axle 18 having the air inlet 58 and outlet 60. As is the conventional mode of assembly, the axle 18 is concentrically coupled to inner bearing assembly 15 and the outer bearing assembly 19. The sealing of the wheel hub is by use of the oil seal and gasket 22,24 juxtaposition to the inner bearing assembly 15. The wheel hub 12 is releasably fastened to the axle 18 by a washer 26, nut 28, and cotter pin 29. The cap 30 includes a seal 32 for providing an air tight seal along the outer bearing assembly. Pressure gauge 62 can be mounted to the cap 30 providing visual indication of seal integrity at the wheel hub. In order to provide an improved air tight seal at the point of connection of the inner bearing assembly and the axle, the system of the invention can further include the inclusion of a polished sleeve 25 which provides a smoother surface for the air seal. For instance, should an existing axle be reworked to accommodate the instant invention, the use of a sleeve can be sealing secured to the axle to provide a smooth surface for the oil seal. The greatest wear problem for the oil seal is the poor surface preparation of the axle that results in premature failure of the oil seal. The use of a sleeve on used axles provides extended oil seal life. In addition, poor manufacturing of an axle can also be rectified by the sleeve.

The present invention advantageously allows the user (or a law enforcement official) to quickly visually inspect each trailer wheel to determine the integrity of the seals within the wheel hub. If the pressure is maintained within a wheel hub, the seals are sound, and the trailer wheels can be safely submerged without danger of water damage. When a loss in air pressure is observed, it is an indication that repairs to restore the integrity of the seals must be completed before the trailer can be used in water. While the prior art devices also provide a visual indication of broken seals, they do not require repairs in order to continue use of the trailer, but instead allow the user to temporality remedy the situation by pumping grease into the wheel hub to stop water penetration by maintaining the grease under pressure. Since the leak has not been actually been repaired, the pressurized grease continues to be ejected into the water when the prior art devices are used. In contrast, the system of the present invention requires the repair of hub leaks, and does not continuously pollute the waters in which the trailer is deployed.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings. The instant invention can be used on automobile and truck axles including CV joints, or on any other coupling where integrity of the bearing housing is critical. It should be noted that proper seals prevents road grit or other contaminants from entering the bearing housing thereby enhancing bearing life.

What is claimed is:

1. A pressurized wheel hub for a trailer having at least one axle, comprising: a wheel hub having bearings that are rotatably securable to the axle; seals between said wheel hub and said axle, said seals forming a closed air space around said bearings; and a pneumatic chamber, which is coaxially disposed within said axle, having an inlet adapted for fluidly coupling to a source of pressurized air and an outlet coupled to said closed air space, said source of pressurized air maintaining between 1 psi and 30 psi in said closed air space.

2. The pressurized wheel hub according to claim 1 including a means for measuring the amount of pressurized air placed within said closed air space.

3. The pressurized wheel hub according to claim 2 wherein said means for measuring is further defined as a pressure gauge providing a visual indication of the pressurized air whereby a breached seal condition within said wheel hub can be detected.

4. The pressurized wheel hub of claim 3, wherein said air pressure gauge includes a dial face and a pressure indicating needle moving relative to said dial face in direct relation to the air pressure within said closed air space.

5. The pressurized wheel hub of claim 3, wherein said air pressure gauge includes a color coded dial face capable of indicating safe operation of the wheel hub.

6. The pressurized wheel hub of claim 5, wherein said air pressure gauge is fluidly coupled to said closed air space.

7. The pressurized wheel hub of claim 1, wherein said pneumatic chamber is coupled to a DC air compressor located on the trailer.

8. The pressurized wheel hub of claim 1, wherein said pneumatic chamber is coupled to a DC air compressor located on a towing vehicle.

9. The pressurized wheel hub of claim 1 including a polished sleeve securable to said axle and operatively associated with said seals, wherein said polished sleeve provides a machined surface to permit enhanced sealing.

10. The pressurized wheel hub of claim 1, further comprising an air pressure gauge fluidly coupled to said closed air space.

* * * * *